US006082888A

United States Patent [19]

Sakayori

[11] Patent Number: 6,082,888

[45] **Date of Patent: *Jul. 4, 2000**

[54] CONSTANT RATE DISCHARGE APPARATUS AND CONSTANT RATE DISCHARGE METHOD

[75] Inventor: Toshimasa Sakayori, Hachiouji, Japan

[73] Assignee: Three Bond Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,182

[22] Filed: Mar. 17, 1997

[30] Foreign Application Priority Data

Jun. 11, 1996 [JP] Japan .................................... 8-149122

[51] Int. Cl.[7] ............................ B05C 11/10; F04B 49/06; G05D 7/00

[52] U.S. Cl. ................................ 364/528.18; 364/528.39; 222/384; 141/1; 417/42

[58] Field of Search ......................... 364/528.17, 528.18, 364/528.39, 528.36; 222/52, 61, 372, 384; 141/1, 2, 192; 417/1, 22, 42, 212, 339; 210/90; 427/421; 264/40.1, 40.5

[56] References Cited

U.S. PATENT DOCUMENTS

| | | | |
|---|---|---|---|
| 4,325,896 | 4/1982 | Rodgers, Jr. | 264/40.1 |
| 5,252,037 | 10/1993 | Carlson | 417/339 |
| 5,395,565 | 3/1995 | Nagaoka et al. | 264/40.5 |
| 5,419,930 | 5/1995 | Schucker | 427/421 |
| 5,637,208 | 6/1997 | Dourdeville | 210/90 |

FOREIGN PATENT DOCUMENTS

| | | |
|---|---|---|
| 0197632 | 10/1986 | European Pat. Off. . |
| 91/0606 | 5/1991 | WIPO . |
| WO92/00813 | 1/1992 | WIPO . |

*Primary Examiner*—Melanie A. Kemper
*Attorney, Agent, or Firm*—Lowe Hauptman Gopstein Gilman & Berner

[57] ABSTRACT

A pump unit is provided which sucks a material having a high viscosity contained in a container and to pump it to a nozzle under pressure. An axial member which performs sucking and pumping of the material is connected with the pump unit. The axial member is axially slidable by the pressure of air supplied to the cylinder. The material which is sucked into the pump unit is discharged from the nozzle by the increase in pressure occurred when the axial member descends. A sensor is provided in the vicinity of the axial member. A result of detection of the sensor is supplied to a controller. A reference speed when constant rate application is performed is presettable in the controller. Correction of pressure is conducted by comparing the actual moving speed of the axial member with the reference speed.

8 Claims, 1 Drawing Sheet

10 32 36 34 18A 18 18B 30 17 33 CONTROLLER 40 11 15 14 21 25 20 24 38 SEAL CONTROL PANEL 13 12 M 39 ROBOT 16

CONTROLLER
SEAL CONTROL PANEL
ROBOT
10
11
12
13
14
15
16
17
18
18A
18B
20
21
24
25
30
32
33
34
36
38
39
40
M

CONSTANT RATE DISCHARGE APPARATUS AND CONSTANT RATE DISCHARGE METHOD

BACKGROUND OF THE INVENTION

1. Technical Field of the Invention

The present invention relates to a constant rate discharge apparatus and a constant rate discharge method capable of controlling the rate of a high viscosity material discharged from the apparatus.

2. Prior Art

High viscosity materials such as silicone rubber, epoxy resin, grease and the like are being increasingly used as sealing materials or lubricants applied between mechanical parts since their sealing ability is high and reduction in cost can be achieved. Materials of this type are contained in a container of a material discharge apparatus and discharged from a nozzle by actuation of a pump unit linked with the container.

However, pressure adjustment relies only upon the operator's manual adjustment in the conventional material discharge apparatus since the discharge rate of the material is kept constant by adjustment of the pressure in the cylinder for actuating the pump unit. In this case, problems arise in that the operator must always monitor a pressure meter and pressure adjustment based upon such montoring is dependent upon the operator's skill. In addition, high viscosity materials change their viscosity depending upon both changes in ambient temperature and different production lots. The discharge rate of the material also has a strong tendency to change over time. Accordingly, a considerable burden is imposed on the operator.

There exists an apparatus which is capable of pumping the above-mentioned materials under pressure by means of a servo-motor and the like in order to conduct a constant rate discharge for the above-mentioned materials. Such an apparatus has disadvantages in that its manufacturing cost is high and its structure is complicated. Further, the weight of the discharge apparatus is high. If the discharge apparatus is linked with an application robot, an excessively high load would be disadvantageously applied on the robot.

SUMMARY OF THE INVENTION

The present invention was made to overcome the above-mentioned disadvantages of the prior art. It is an object of the present invention to provide a constant rate discharge apparatus and a constant rate discharge method which is capable of automatically controlling the discharge pressure by detecting or monitoring changes in the discharge rate due to changes in the viscosity of material.

In order to accomplish the above-mentioned object, the present invention provides a constant rate discharge apparatus including a container which contains a material having a given viscosity; a pump unit for supplying the material to a nozzle, and a cylinder for driving an axial member which operates the pump unit. The material in the pump unit can be discharged from the nozzle when the axial member is moved by the cylinder. A sensor detects the moving speed of the axial member and a controller is provided which conducts pressure adjustment of the cylinder based upon an output of the sensor. With such an arrangement, if the viscosity of the material changes for some reason, the fluidic resistance of the material inevitably changes. These changes cause the moving speed of the axial member to increase or decrease. Accordingly, applying to the cylinder an appropriate pressure based upon the comparison between the sensor detected moving speed of the axial member and the reference speed results in discharge of the material at a constant rate. The reference speed may be herein determined based upon the speed of the axial member for a given discharge rate.

It is preferable that the cylinder include a pneumatic cylinder and that the moving speed of the axial member is controlled by controlling amount of the air supplied to the cylinder. By using the pneumatic cylinder, the cost of manufacturing the apparatus can be reduced by its simple structure and maintenance and inspection can be easily conducted.

DETAILED DESCRIPTION OF THE PREFERRED EMBODIMENT

Figure 1:
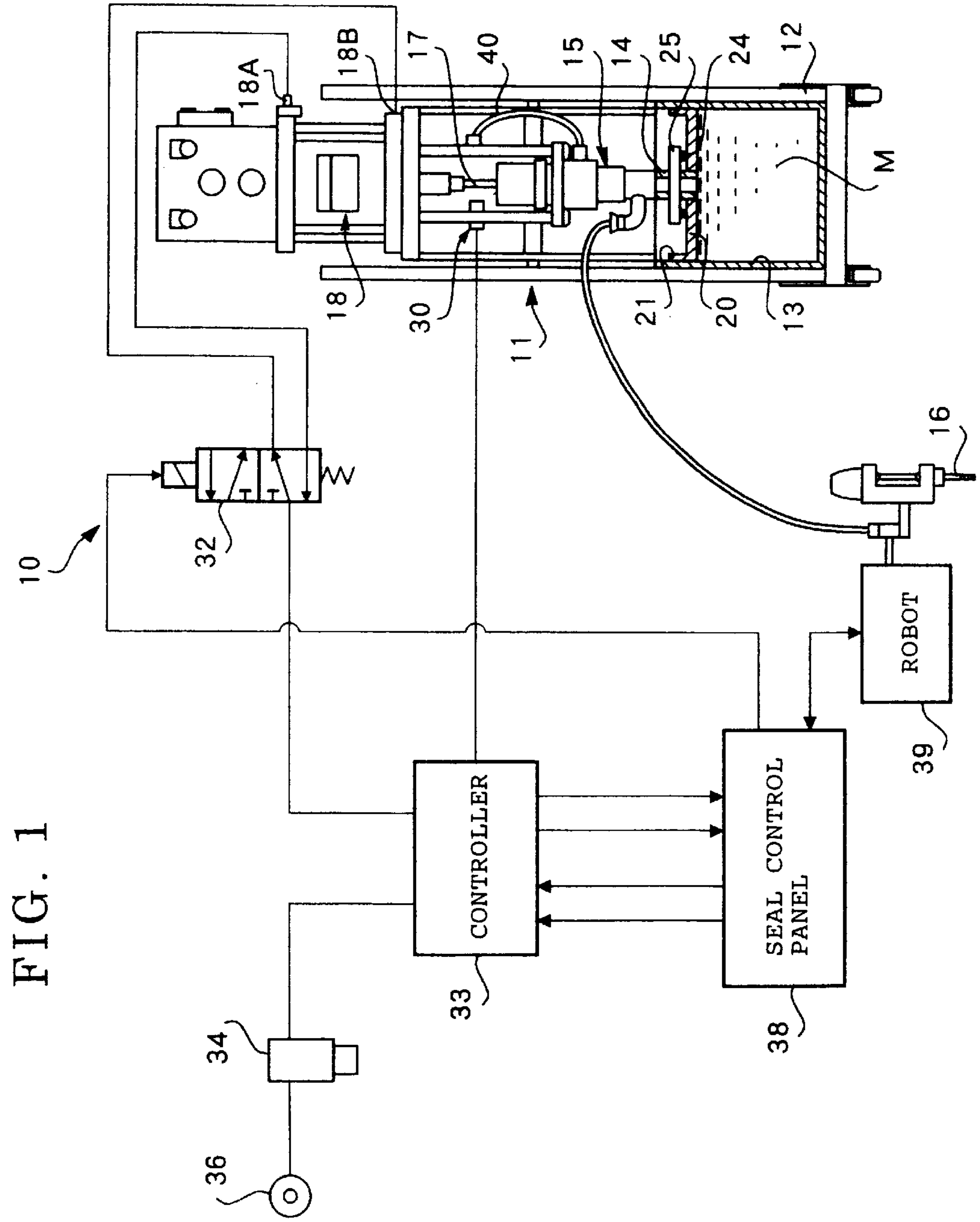
FIG. 1 is a view partly in section and partly schematic, of an example of a constant rate discharge apparatus of the present invention.

Now, an embodiment of the present invention will be described with reference to the drawings.

The structure of the whole of an apparatus of one embodiment of the present invention is schematically shown in FIG. 1. In this drawing, a constant rate discharge apparatus 10 includes a main body 11 comprised of a container 13 which is disposed in a lower position within a movable frame 12, a pump unit 15 which is in communication with the container 13 through a material passage sleeve 14, a nozzle 16 which is connected with the pump unit 15 through a hose and which is capable of discharging the material therefrom by means of the pump unit 15, and a pneumatic cylinder 18 which drives an axial member in a vertical direction for operating the pump unit 15.

A high viscosity material M such as silicone and the like is contained in the container 13. A wiper plate 20 is formed at its midpoint with a hole constituting a material passage disposed above the level of the material M. The wiper plate 20 is also formed on its periphery with a flange 21 is slidable along the inner peripheral surface of the container 13 so that it can descend while scraping the material M adhered to the inner peripheral surface. The wiper plate 20 also serves to constantly keep the inside of the container 13 in a pressurized condition under the weight of the pump unit 15 and the cylinder 18, etc. which are located above the wiper plate 20.

The material passage sleeve 14 is fitted into the hole of the wiper plate 20 and a stationary flange 25 is mounted on the outer periphery of the sleeve with a seal ring 24 interposed between the flange and the top surface of the wiper plate. The pump unit 15 which is above the material passage sleeve 14 is adapted to suck the material M therein when the axial member 17 is moved upwards by the cylinder 18 and to pump the material toward the nozzle 16 for discharging the material M from the nozzle 16 when the axial member 17 is moved downwards. The pump unit 15 further includes a check valve (not shown) for preventing the material M from returning to the container 13 which may otherwise occur when the axial member 17 descends.

A sensor 30 is disposed in a lateral position of the axial member 17. The sensor 30 includes a laser sensor in the present embodiment. Various sensors which can perform an equivalent function to detect the movement of the axial member 17 may be in lieu of the laser sensor used herein. A contact type sensor may of course be used.

The cylinder 18 is formed in upper and lower portions thereof with ports 18A and 18B, respectively. These ports

18A, 18B are connected with an air source 36 via an electromagnetic valve 32, controller 33 and air filter 34. Accordingly, the supply of air into the cylinder 18 and adjustment of the rate of the supplied air, that is, adjustment of the air pressure in the cylinder 18 can be accomplished under control of the controller 33. The controller 33 is connected with the sensor 30 so that it can properly adjust the air pressure applied to the cylinder 18 in response to an output signal from the sensor 30. The controller 33 is provided with various preset switches, dip switches, a liquid crystal display which displays the pressure value and the like and indicator lamps for indicating the states of various alarms and the moving speed of the axial member so that an operator can visually monitor the state of the operation of the constant rate discharge apparatus 10.

A seal control panel 38 controls the driving of a robot 39 which actuates the nozzle 16 as well as an integrated control of other components including the controller 33. A reference numeral 40 denotes an air bleeding hose.

The operation of the apparatus in the present embodiment will now be described.

First, pressure adjustment is manually conducted so that an optimum rate of discharge can be obtained depending upon the work to be applied with a discharged material, the viscosity of the material, etc. The moving speed of the axial member 17 when the material can be appropriately applied is stored and preset in the controller 33 as a reference speed. The actual moving speed of the axial member 17 is constantly compared with the stored reference moving speed. When the difference between both speeds exceeds a given range, the pressure is adjusted so that the actual moving speed of the axial member 17 will approach the reference moving speed. The pressure correction is not rapidly and largely conducted, but is conducted by such a very small amount that the speed can be returned to an appropriate value after several applications of the material. In the present embodiment, the maximum amount by which the pressure is corrected is preset to 0.05 $kgf/cm^2$. If the actual moving speed is largely different from the reference speed, pressure correction is conducted by the maximum amount. The moving speed of the axial member 17 is controlled to decrease the corrected amount as the moving speed approaches the reference speed as precisely and prematurely as possible. The corrected amount is determined based upon an average value which is obtained by N samplings. The number of samplings N is variable.

When air supply to the cylinder 18 is started to initiate the discharge operation after the initial preset is conducted, the axial member 17 is moved upward which causes the pressure within the pump unit 14 to be negative, so that the material M is sucked up into the pump unit. When the axial member 17 descends, the check valve (not shown) is closed. The increase in pressure in the pump unit 14 which is caused by the descending axial member 17 causes the material M to be pumped to the nozzle 17 under pressure.

The moving speed of the axial member 17 is detected by the sensor 30 at predetermined time in the course of the discharge operation. The result is fed to the controller 33. If the result of comparison between the measured speed and the reference speed determines that the actual moving speed of the axial member 17 is lower than the reference speed, correction of the pressure is conducted to increase the pressure. On the other hand, if it is determined that the moving speed of the axial member 17 is higher than the reference speed, correction is conducted to decrease the pressure. Continuity of operation is not lost since the adjustment is stepwise conducted even if comparison of the speeds shows a deviation.

The above-mentioned operation is automatically conducted. In the present embodiment, manual correction may be conducted by an operator. In this case, the actual moving speed of the axial member 17 is compared with the reference speed. The pressure may be steplessly adjusted depending upon the difference. This makes it possible to preset an appropriate state on starting of the constant rate discharge apparatus 10 within a short period of time and makes it easier to cope with the case in which a material, empirical data of which are not known is to be discharged.

In the above description, conditions of operation are only exemplified. The conditions such as the number of samplings, the amount of pressure to be corrected and criteria of determination of abnormality may be desiredly determined depending upon the application conditions of each material. Although the pressure is corrected based upon the average value which is obtained by conducting sampling plural times, an alarm may be issued if it is determined that an extreme abnormality occurs.

Although the cylinder 18 is a pneumatic cylinder, it may be a hydraulic cylinder. It is more advantageous to use the pneumatic cylinder in order to achieve simplification of the structure and reduction in fabrication and maintenance cost.

Although the embodiment in which the apparatus is of a vertically disposed type has been illustrated and described, the present invention is not limited to this embodiment. The present invention can be equally embodied as a laterally disposed type apparatus.

The material is sucked up and then pumped to the nozzle 16 under pressure in the above-mentioned embodiment. Alternatively, the material may be directly discharged by the wiper plate 20 for pressurizing the inside of the container 13.

The present invention is configured and is arranged to operate as mentioned above. Accordingly, adjustment of pressure to maintain a constant rate of discharge can be automatically achieved by detecting or monitoring the variations in the amount of the discharge occurred due to change in the viscosity of the material and the like. An apparatus can be provided which is capable of achieving constant rate discharge in a very simple and accurate manner in comparison with the manual adjustment which has heretofore been conducted by an operator.

Since means for measuring the change in the rate of discharge comprises a sensor which measures the moving speed of the axial member, the means makes it possible to use the sensor for existing material discharge apparatus. This can enhance the versatility of the apparatus and can achieve effective use of existing facility.

The arrangement using a pneumatic cylinder achieves more simplification and reduction in weight of the apparatus in comparison with the case in which hydraulic means are used. It is easy to transport the whole apparatus and to handle it.

What is claimed is:

1. A constant rate discharge apparatus including a container which contains a material having a given viscosity; a pump unit for supplying said material to a nozzle, and a cylinder for driving an axial member which operates the pump unit, wherein the material in the pump unit can be discharged from the nozzle when the axial member is moved by the cylinder, further comprising a sensor for detecting the moving speed of the axial member provided in the vicinity of the axial member and a controller which conducts pressure adjustment of the cylinder based upon comparison of a manually determined reference moving speed stored in the controller with an output of the sensor, to obtain a constant rate of discharge wherein the pressure is corrected by a predetermined small amount so that the pressure can be returned to an appropriate value after several applications of the material.

2. A constant rate discharge apparatus as defined in claim 1, characterized in that said cylinder includes a pneumatic cylinder and wherein the moving speed of the axial member is adjusted by controlling the rate of air supplied to the pneumatic cylinder.

3. A constant rate discharge method including a container which contains a non-particulate material in the form of a high viscosity material selected from the group consisting of silicon rubber, epoxy resin, and grease used as a sealing material or a lubricating material; a pump unit for supplying said material to a nozzle, and a cylinder for driving an axial member which operates the pump unit, wherein the non-particulate material in the pump unit can be discharged from the nozzle when the axial member is moved by the cylinder, comprising the steps of driving the axial member to supply the said non-particulate material from the container to the pump unit; and discharging the non-particulate material in the pump unit through the nozzle in one of a sealing application and a lubricating application, wherein the moving speed of the axial member is detected and compared with a reference speed and in that correction of the pressure in the cylinder is conducted in such a manner that the detected moving speed matches the reference speed such that the pressure is corrected by a predetermined small amount so that the pressure can be returned to an appropriate value after several applications of the material.

4. A constant rate discharge method as defined in claim 3, characterized in that said reference speed is determined based upon the moving speed of the axial member when the material is appropriately applied by conducting manual pressure adjustment so that an optimum rate of discharge is obtained depending upon a work to be applied with the material and the viscosity of the material and in that the moving speed when the material is applied on the work is compared with the reference speed and the speed of the axial member is corrected to approach to a reference speed when the difference between the reference speed and actual moving speed is deviated from a given range.

5. A constant rate discharge method as defined in claim 4, characterized in that the pressure is corrected by a predetermined small amount so that the pressure can be returned to an appropriate value after several applications of the material.

6. A constant rate discharge method as defined in claim 4, characterized in that the pressure is corrected by a predetermined maximum amount when the actual moving speed is largely different from the reference speed and the amount by which the pressure is to be corrected is decreased as the moving speed approaches the reference speed.

7. A constant rate discharge apparatus including a container which contains a material having a given viscosity; a pump unit for supplying said material to a nozzle, and a cylinder for driving an axial member which operates the pump unit, wherein the material in the pump unit can be discharged from the nozzle when the axial member is moved by the cylinder, further comprising a sensor for detecting the moving speed of the axial member provided in the vicinity of the axial member and a controller which conducts pressure adjustment of the cylinder based upon comparison of a manually determined reference moving speed stored in the controller with an output of the sensor to obtain a constant rate of discharge, characterized in that the pressure is corrected by a predetermined maximum amount when the actual moving speed is largely different from the reference speed and the amount by which the pressure is to be corrected is decreased as the moving speed approaches the reference speed.

8. A constant rate discharge method including a container which contains a non-particulate material in the form of a high viscosity material selected from the group consisting of silicon rubber, epoxy resin, and grease used as a sealing material or a lubricating material; a pump unit for supplying said material to a nozzle, and a cylinder for driving an axial member which operates the pump unit, wherein the non-particulate material in the pump unit can be discharged from the nozzle when the axial member is moved by the cylinder, comprising the steps of driving the axial member to supply the said non-particulate material from the container to the pump unit; and discharging the non-particulate material in the pump unit through the nozzle in one of a sealing application and a lubricating application, wherein the moving speed of the axial member is detected and compared with a reference speed and in that adjustment of the pressure in the cylinder is conducted in such a manner that the detected moving speed matches the reference speed, characterized in that the pressure is corrected by a predetermined maximum amount when the actual moving speed is largely different from the reference speed and the amount by which the pressure is to be corrected is decreased as the moving speed approaches the reference speed.

* * * * *